(12) United States Patent
Batcher

(10) Patent No.: US 6,813,707 B1
(45) Date of Patent: Nov. 2, 2004

(54) ENHANCING INSTRUCTION EXECUTION USING BUILT-IN MACROS

(75) Inventor: Kenneth W. Batcher, Hudson, OH (US)

(73) Assignee: Cisco Technology INc., San Jose, CA (US)

(*) Notice: Subject to any disclaimer, the term of this patent is extended or adjusted under 35 U.S.C. 154(b) by 608 days.

(21) Appl. No.: 09/681,348

(22) Filed: Mar. 23, 2001

(51) Int. Cl.[7] .............................................. G06F 9/30
(52) U.S. Cl. ..................................................... 712/242
(58) Field of Search ........................ 712/242; 709/108

(56) References Cited

U.S. PATENT DOCUMENTS

| | | | | |
|---|---|---|---|---|
| 4,677,545 A | * | 6/1987 | Blahut | 712/245 |
| 5,408,672 A | * | 4/1995 | Miyazawa et al. | 712/37 |
| 5,701,487 A | * | 12/1997 | Arbouzov | 717/124 |
| 5,893,923 A | * | 4/1999 | Bush et al. | 711/154 |
| 6,079,008 A | * | 6/2000 | Clery, III | 712/11 |
| 6,453,278 B1 | * | 9/2002 | Favor et al. | 703/27 |

* cited by examiner

*Primary Examiner*—Eric Coleman
(74) *Attorney, Agent, or Firm*—Tucker Ellis & West LLP

(57) ABSTRACT

An instruction execution system using an "on-chip" ROM device to store one or more frequently used MACROs. A MACRO CALL instruction is used to redirect an instruction stream to one or more MACROs stored in the ROM device, and to transfer processing control to a MACRO control unit (MCU) and a MACRO Program Counter (MPC). The MACRO program Counter is used to address memory locations within the ROM device, while the MACRO control unit (MCU) will cause instructions to be fetched from MACRO ROM 100, rather than off-chip memory 10, in accordance with the parameters of the MACRO CALL instruction. The number of instructions retrieved from the ROM device to complete execution of a MACRO is determined by an argument of the MACRO CALL instruction.

25 Claims, 3 Drawing Sheets

0x26 macro address

| | | |
|---|---|---|
| LABEL1 | ADD R3,R4,R3 | ; add R4 to R3, store in R3 |
| | ADD R7,R7,#1 | ; add 1 to R7 |
| | MWR [R7],R3 | ; write R3 value to address in R7 |
| | SUBI R0,R0,#2 | ; decrement R0 by 2 |
| | ADDI R7,R7,#1 | ; add 1 to R7 |
| | MRD [R7],R3 | ; read next value |
| | BnZ R0,LABEL1 | ; branch if not zero to LABEL1 |

0x50 macro address

| | |
|---|---|
| MOVI #20,R4 | ; mov immediate value |
| MOVI #10,R5 | ; mov immediate value |
| MUL R2,R3,R5; | ; multiply R3xR5 and put in R2 |
| MUL R3,R4,R2 | ; multiply R4xR2 and put in R3 |
| CMP R3,R4 | ; compare R3 and R4 again |

FIG. 2

ENHANCING INSTRUCTION EXECUTION USING BUILT-IN MACROS

BACKGROUND OF INVENTION

The field of the present invention relates generally to instruction processing, and more particularly to a system for processing instructions using macros.

The trend toward low cost processors is often a driving force in the design of many embedded processor systems. Typically, custom application specific integrated circuit (ASIC) devices are built around a central processor core along with interface units and on-chip memory to form a complete system. Such systems often have an external memory interface which is used to access a memory space much larger than that which can be placed in embedded RAM on-chip. Due to the need for higher performance and increased software functionality, designers must rely on fast off-chip RAMs, which can meet the low latency demands of high speed processors. Even with fast RAMs, the off-speed access requirements often constitute a bottleneck that compromise the overall processor speed, which is often capable of speeds above 100 MHz or more, if it was not for the slow external memory interface.

Moreover, in small environments where board real-estate is at a premium (such as mini-PCl and Cardbus form factors), off-chip memories take up valuable area. Since RAMs require parallel address and data lines, as well as various control signals, they often pose a further challenge to board routing, which adds to the overall system size. In portable environments, off-chip RAMs which are clocked at high speeds often consume a great deal of power. Also, the cost of off-chip RAM is expensive, often meeting or exceeding the cost of the ASIC processor. Cost sensitivity in the consumer market is yet another reason making off-chip memories less attractive. However, increasing functionality results in larger and larger software programs requiring more and more memory to hold instructions as well as data.

Embedded processor systems therefore often strive to eliminate the amount of off-chip memory required. This reduces overall cost and valuable board area. Also any reduction in the amount off-chip traffic will allow for improved throughput, as well as reduced power consumption.

Commonly, typical embedded processor systems rely on instruction and data caches to reduce the amount of data traffic. Caches are typically on-chip RAMs which contain frequently accessed instructions or data. These are quite effective if designed properly. However, instruction and data cache design do add to overall system complexity due to the need to support algorithms used for cache replacement and cache coherency.

Cache designs also are not well suited for context switching applications. Cache designs depend on locality of reference for good performance. Locality of reference refers to the property that future instructions in the code stream come from a location near the current instruction fetch. Therefore, there is a higher probability of cache hit (i.e., having the next instruction fetch already in the cache line). This is normally the case with conventional code streams, since execution order is largely sequential in nature and hence the cache can react effectively to the deterministic behavior.

However, code that rapidly context switches reacts in a random non-deterministic way. A context switch may involve code fetch from a completely different address which is nowhere near related to the current instruction fetch. Often times when two or more processes cannot fit in the cache, thrashing may result. Thrashing is overhead caused by replacing and restoring cached data to the main off-chip memory in a rapid fashion. Therefore, the processor will waste many CPU cycles just to manage the cache and thus not be performing useful work. Caching in that regard can actually hurt performance due to the extreme overhead seen with fruitless cache updates.

Furthermore, the caching of high priority instructions may result in lower performance. This is especially true in real time operating system environments. A cache miss penalty at an inopportune time can slow down the performance of execution where timing is crucial in order to achieve a real time response. In addition, there is the cache overhead of flushing and reading/writing cached data to keep it consistent and coherent with the memory system. This impacts overall system performance since cache updates waste network or bus bandwidth. Distributed systems also have issues with respect to cache coherency and broadcasting of cache data updates. Embedded processor systems also have cost issues which may prohibit the use of very large caches and associated hardware.

Other approaches use other types of on-chip memories which are not associated with caching. Some systems use embedded scratch pads to store commonly accessed instructions in a buffer, rather than going off chip for this data. These buffers are not managed by the cache hardware, but rather the compiler or software governs the memory allocation. These scratch pads are useful but limited in effectiveness. In this regard, code must be specially written to utilize the scratch pad, and hence is not portable like cache methods. The scratch pad method is less effective for instruction storage than for data storage, since code must be hard compiled into those locations and there is a limit to the amount of code that can be stored on-chip.

The present invention addresses these and other drawbacks of the prior art.

SUMMARY OF INVENTION

According to the present invention there is provided a method for processing instructions in a data processing system including a first memory, a first program counter, an instruction decoder, and an execution unit, the method comprising the steps of: retrieving instructions from the first memory using the first program counter; decoding the instructions retrieved from the first memory using the instruction decoder; generating a macro execution signal in response to decoding of a MACRO CALL instruction; executing of one or more subsequent instructions stored in a second memory using the execution unit and a second program counter, in response to generation of the macro execution signal, wherein said MACRO CALL instruction identifies a macro starting address in the second memory and an offset value indicative a macro ending address; and completing execution of instructions stored in the second memory when the second program counter reaches the macro ending address.

According to another aspect of the present invention there is provided a data processing system comprising: a first memory for storing instructions; a first program counter for addressing the first memory; an instruction decoder for decoding instructions, wherein said instruction decoder generates a macro execution signal in response to decoding of a MACRO CALL instruction; an execution unit for executing instructions; a second memory for storing instructions; a second program counter for addressing the second memory;

and a control unit for controlling the retrieval of instructions from the second memory, wherein said execution unit executes one or more instructions stored in the second memory, in response to generation of the macro execution signal, wherein said MACRO CALL instruction identifies a macro starting address in the second memory and an offset value indicative a macro ending address, wherein execution of instructions stored in the second memory is completed when the second program counter reaches the macro ending address.

According to still another aspect of the present invention there is provided a data processing system comprising: first means for storing instructions; first means for addressing the first means for storing instructions; means for decoding instructions, wherein said means for decoding instructions generates a macro execution signal in response to decoding of a MACRO CALL instruction; means for executing instructions; second means for storing instructions; second means for addressing the second means for storing; and control means for controlling fetching of instructions stored in the second means for storing, wherein said means for executing instructions executes of one or more instructions stored in the second means for storing, in response to generation of the macro execution signal, wherein said MACRO CALL instruction identifies a macro starting address in the second means for storing and an offset value indicative a macro ending address, wherein execution of instructions stored in the second means for storing is completed when the second means for addressing reaches the macro ending address.

According to yet another aspect of the present invention there is provided a method of operating a data processing system to execute one or more instructions stored in an on-chip memory device located on-chip with data processing components and an off-chip memory device located remote therefrom, comprising: fetching a MACRO CALL instruction from the off-chip memory device; decoding the MACRO CALL instruction to identify a macro stored in the on-chip memory device; executing the MACRO CALL instruction, wherein execution of the MACRO CALL instruction results in the generation of a macro execution signal, wherein said macro execution signal causes retrieval and execution of one or more instructions from the on-chip memory, and ending upon detection of the end of the macro.

An advantage of the present invention is the provision of an instruction processing system, which allows more frequently executed instructions to be readily available.

Another advantage of the present invention is the provision of an instruction processing system, which allows for a reduction in off-chip instruction fetching.

Another advantage of the present invention is the provision of an instruction processing system, which allows for a deterministic instruction execution speed.

Another advantage of the present invention is the provision of an instruction processing system, which reduces the overall memory space needed to hold a program.

Still another advantage of the present invention is the provision of a an instruction processing system, which reduces power consumption.

Yet another advantage of the present invention is the provision of an instruction processing system, which allows for faster instruction execution speed.

Still other advantages of the invention will become apparent to those skilled in the art upon a reading and understanding of the following detailed description, accompanying drawings and appended claims.

BRIEF DESCRIPTION OF DRAWINGS

The invention may take physical form in certain parts and arrangements of parts, a preferred embodiment and method of which will be described in detail in this specification and illustrated in the accompanying drawings which form a part hereof, and wherein:

FIG. 2 illustrates a MACRO ROM storing an exemplary macro; and

DETAILED DESCRIPTION

In summary, the present invention uses an on-chip ROM device to store a set of macros. A macro is a set of two or more commonly executed instructions which appear sequentially in the application software. Macros are quite common in assembly language and source language software programs. They are typically "expanded in line" when compiled to an executable image, which means the macros are replaced with the equivalent sub-instructions. It should be appreciated that the present invention is directed to instruction fetch optimization, rather than data read/write (R/W) optimization.

Figure 1:
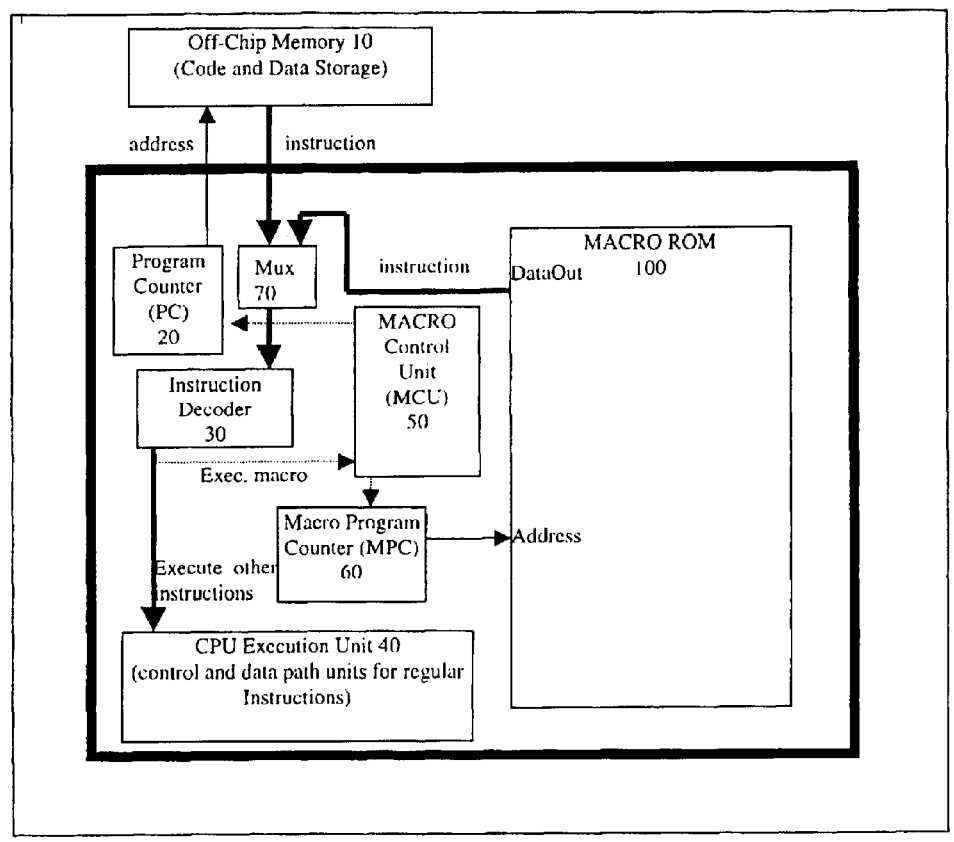
FIG. 1 shows an instruction processing system according to a preferred embodiment of the present invention.

Referring now to the drawing(s) wherein the showings are for the purposes of illustrating a preferred embodiment of the invention only and not for purposes of limiting same, FIG. 1 illustrates a physical implementation of an instruction processing system according to a preferred embodiment of the present invention. The instruction processing system includes a MACRO control unit (MCU) 50, a MACRO program counter (MPC) 60 and an "on-chip" (i.e. located on the same semiconductor device) MACRO ROM 100. These elements cooperate with conventional CPU components, such as a program counter (PC) 20, an instruction decoder 30, and a CPU execution unit 40 (data path and control units). An "off-chip" memory 10 (typically a RAM) is also shown. It should be understood that memories 10 and 100 may take the form of various types of memory devices, including ROM, PROM, RAM, Cache, etc.

In accordance with a preferred embodiment of the present invention, a new instruction is provided in the instruction set of the embedded processor. This instruction is referred to herein as a MACRO CALL, and redirects an instruction stream to fetch an "on-chip" MACRO stored in MACRO ROM 100, until execution of the MACRO stored therein has been completed.

Application programs are written to utilize embedded MACRO CALL instructions into the source code, rather than expanding the equivalent MACRO source instructions in line. This may be done using a special compiler or reassembler to achieve an equivalent code image. On-chip MACROs are selected by a programmer and compiled into Macro ROM 100 based on frequency of occurrence and/or frequency of use in the program. MACROs may also be selected based on the priority of the code stream (e.g., how important it is to execute the code in a timely and deterministic fashion). To be selected as a MACRO an instruction sequence is preferably a "basic block." A basic block is a set of instructions which have no branches to other sections of code. Branches to other instructions in the MACRO are possible, but for ease of programming they must be PC relative branches. A PC relative branch is one whose target is determined at run time, not compile time. This allows the MACRO to constitute only relocatable code so that MACROs can appear anywhere in the source program.

The MACRO CALL instruction accepts two arguments: (1) a starting address of the desired "on-chip" MACRO stored in MACRO ROM 100 and (2) an address offset indicative of the ending address of the "on-chip" MACRO. The address offset is added to the starting address to obtain the ending address of the MACRO. For example, the instruction MACRO CALL x10,x6 will execute the "on-chip" MACRO stored at starting address x10 (hex) of MACRO ROM 100, until MACRO ending address x16 (i.e., x10+x6) is reached. It should be appreciated that other means may be used to detect the end of the MACRO including dedicated MACRO END instructions (in the MACRO ROM 100). Another approach might use an instruction count field in the MACRO CALL which indicates number of instructions to execute from MACRO ROM 100 before terminating.

Normal instruction fetch activity commences with program counter (PC) 20 generating an address of "off-chip" memory 10, from which an instruction is fetched. Memory 10 typically takes the form of a RAM device. Memory 10 provides the instruction that is to be executed by CPU execution unit 40. Accordingly, the fetched instruction is fed into instruction decoder 30. Normal instructions decoded by instruction decoder 30 are passed to CPU execution unit 40 for execution. However, when instruction decoder 30 decodes a MACRO CALL instruction, an "execute macro" signal is generated by instruction decoder 30. The "execute macro" signal causes MACRO control unit (MCU) 50 to further process the MACRO CALL instruction, by processing: (1) an address of MACRO ROM 100 where the MACRO starts ("starting address"), and (2) an address offset (i.e., indicative of the ending address of the MACRO being called). Thereafter, MCU 50 will cause subsequent instruction fetches to be steered to retrieve instructions from MACRO ROM 100, rather than off-chip memory 10, until the MACRO CALL instruction completes execution in accordance with the address offset (which is indicative of an "ending address"). MCU 50 controls a multiplexer 70 to select the source of instructions. The MACRO program counter MPC 60 is used to provide the fetch address for MACRO ROM 100 so that the appropriate macro instructions can be fetched from MACRO ROM 100.

It should be understood that Instructions fetched from MACRO ROM 100 will be processed in a normal manner by instruction decoder 30 and CPU execution unit 40. MCU 50 determines whether instructions will be fetched from MACRO ROM 100, rather than off-chip memory 10, based upon the parameters of a MACRO CALL instruction.

The present invention provides improvements to the instruction execution rate, since "on-chip" instruction execution is faster than "off-chip" instruction execution. Moreover, the present invention provides for power reduction, and the ability to execute a Harvard-style bus operation for the duration of the MACRO CALL instruction execution, since instruction fetches and data read/write activity no longer come from the same "off-chip" memory device and memory bus (e.g., VonNewman architecture). In the absence of this feature, instruction fetches must be stalled while read/write activity occurs.

During the time which the MACRO CALL instruction is executing, MACRO control unit 50 closely examines the instruction stream fetched out of MACRO ROM 100. Program counter (PC) 20 is stalled during this time period, since instruction execution no longer occurs from "off-chip" memory 10. When the MACRO CALL instruction has completed execution (i.e., the "ending address" has been reached), program counter 20 resumes operation to continue executing at the next instruction after the MACRO CALL instruction.

In accordance with a preferred embodiment of the present invention, MACRO control unit 50 is designed such that MACROS stored in MACRO ROM 100 may contain branches that loop back to other portions of the MACRO body. Therefore, a three line MACRO may loop internally hundreds of times before reaching the "ending address" and leaving MACRO ROM 100. Furthermore, MACRO control unit 50 is designed to allow MACROs to call other MACROs, which results in a nested structure. It should be appreciated that applications using context switching must be carefully designed to correctly execute using MACRO ROM 100.

It should be appreciated that for small embedded CPUs, a compiler (i.e., a device capable of translating higher level source code, such as C++, into low level assembly code for the target CPU) may not be available. Furthermore, it should be understood that it may be advantageous for high performance and lower level real-time operating system code to be written in assembler code due to the advantages of code density and speed; as well as the need for low "bit level" control over vital target CPU functions. Therefore, designers who program embedded processor systems for real time systems often use assembly language with MACRO CALLs, which is ideally suited to this application.

Set forth below is a sample assembly language program before use of the present invention to provide a "built-in macro." This code example is thoroughly commented so that the semantics and mnemonics used can be understood more easily. In this program there are 7 basic blocks. The seven instructions starting with line 4 and ending with line 11 and the five instructions starting with line 13 and ending with line 17 are the two basic blocks selected for use in MACROs, as will be illustrated further below.

| | | Original Source Code Body: | |
|---|---|---|---|
| 1. | MOVI | #100,R0 | ; starting counter value in R0 |
| 2. | MOVI | #0,R4 | ; init R4 |
| 3. | MOVI | #0,R3 | ; init R3 |
| 4. | LABEL1 ADD | R3,R4,R3 | ; add R4 to R3, store in R3 |
| 5. | ADD | R7,R7,#1 | ; add 1 to R7 |
| 6. | MWR | [R7],R3 | ; write R3 value to address in R7 |
| 7. | SUBI | R0,R0,#2 | ; decrement R0 by 2 |
| 8. | ADDI | R7,R7,#1 | ; add 1 to R7 |
| 9. | MRD | [R7],R3 | ; read next value |
| 10. | BnZ | R0,LABEL1 | ; branch PC relative if not zero to LABEL1 |
| 11. | CMP | R4,R3 | ; compare R3 and R4 |
| 12. | BGT | R4MAX | ; branch PC relative if R4 > R3 |
| 13. | MOVI | #20,R4 | ; mov immediate value |
| 14. | MOVI | #10,R5 | ; mov immediate value |
| 15. | MUL | R2,R3,R5; | ; multiply R3 × R5 and put in R2 |
| 16. | MUL | R3,R4,R2 | ; multiply R4 × R2 and put in R3 |
| 17. | CMP | R3,R4 | ; compare R3 and R4 again |
| 18. | BGT | END | ; if R3 > R4 then branch to end |
| 19. | CMP | R3,R2 | ; compare R2 to R3 |
| 20. | BGT | LABEL1 | ; if R3 > R2 branch back to label |

-continued

Original Source Code Body:

| 21. | R4MAX | MWR | R7,R3 | ; write contents R3 to register address R7 |
| 22. | BR | LABEL1 | | ; branch back |
| 23. | END | HALT | | ; all done |

The sample assembly language program shown above is converted to an equivalent "Macroized" version, as illustrated below, by replacing selected instructions (lines 4–11 and 13–17) with MACRO CALLs. This results in the revised subprogram using MACROs assigned to MACRO ROM address x26 with offset x7, and another assigned to address x50 with offset x5. The selection of the macro address used to address MACRO ROM 100 is arbitrary but may be done based on other optimization criteria (e.g., maximizing ROM storage, best fit, first fit).

New Source Code Body Using Macros

| 1. | MOVI | #100,R0 | | ; starting counter value in R0 |
| 2. | MOVI | #0,R4 | | ; init R4 |
| 3. | MOVI | #0,R3 | | ; init R3 |
| 4. | LABEL1 | MACRO | x26,x7 | ; call macro at address x26 stop after (x26 + x7) is reached |
| 5. | BGT | R4MAX | | ; branch if R4 > R3 |
| 6. | MACRO | x50,x5 | | ; call macro at address x50 stop after (x50 + x5) is reached |
| 7. | BGT | END | | ; if R3 > R4 then branch to end |
| 8. | CMP | R3,R2 | | ; compare R2 to R3 |
| 9. | BGT | LABEL1 | | ; if R3 > R2 branch back to label |
| 10. | R4MAX | MWR | R7,R3 | ; write contents R3 to address in R7 |
| 11. | BR | LABEL1 | | ; branch back |
| 12. | END | HALT | | ; all done |

An exemplary mapping of the program illustrated above is shown in FIG. 2, but it should be appreciated that other mappings are possible. It should be noted that the first MACRO has a relative branch at the 6$^{th}$ instruction (i.e. BnZ R0, LABEL 1) which jumps back to the start of the MACRO. Therefore, execution may continue for some time in MACRO ROM 100 (e.g. so long as the "BnZ R0,LABEL 1" instruction is not taken), until the terminal address x26+x7 is reached.

Figure 3:
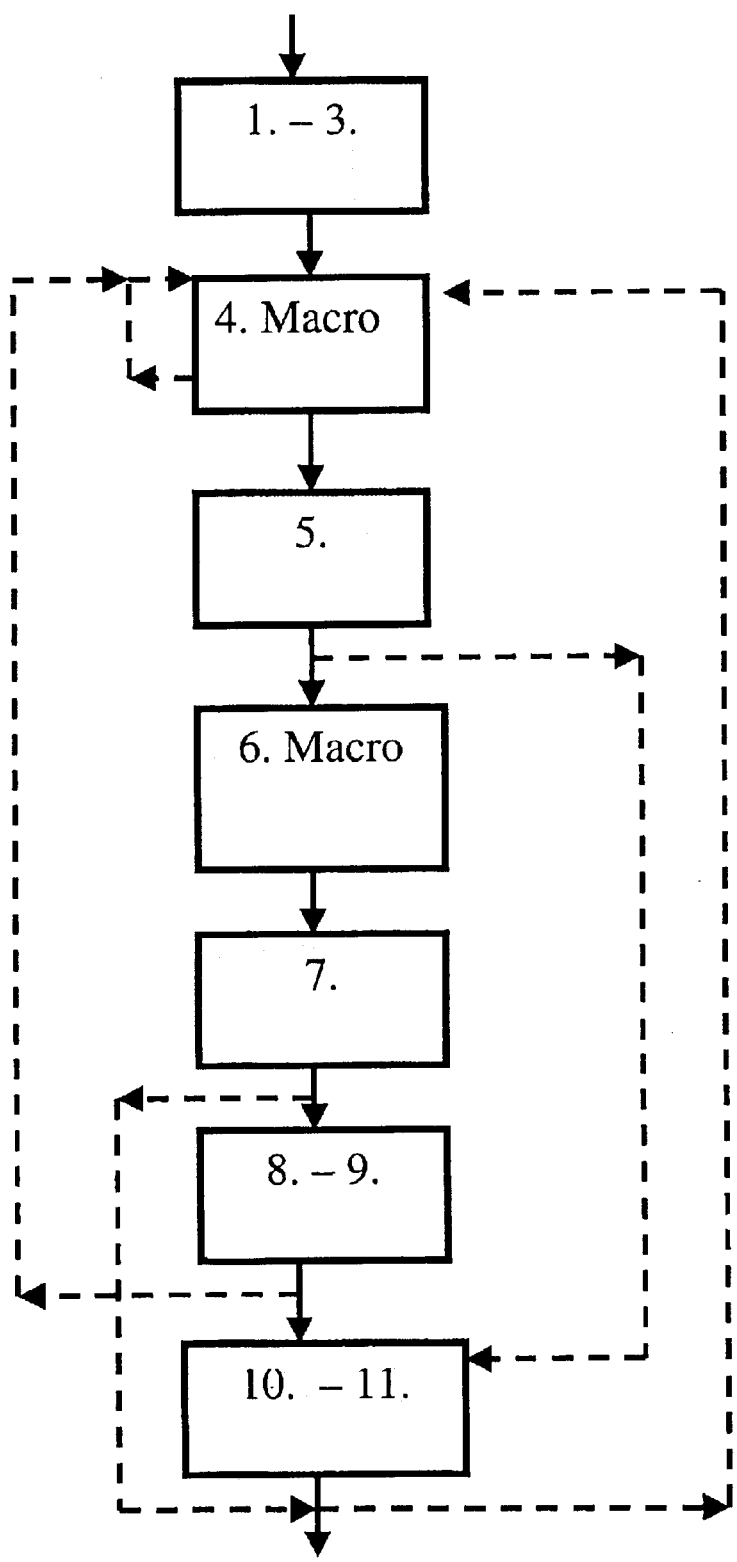
FIG. 3 illustrates the control flow for execution of the exemplary MACRO.

FIG. 3, shows the control flow for the basic block execution of the "Macroized" code version. The numbers indicate the instruction line numbers contained in the basic block of the "Macorized" code version. The dashed lines represent taken branches, while the solid lines indicate sequential execution flow. This figure illustrates how control flow interacts between the MACROs and the non-MACRO program body. Also it should be appreciated that MACROs can be re-executed as a result of branch instructions that target the MACRO.

It should be understood that the present invention differs from the prior art in some important respects, namely:

Deterministic Code Performance—code written using the present invention will execute in a deterministic way. Therefore, performance does not rely on how well a cache controller is operating at that point in time. There is no concept of a cache miss. Hence, code written to address time critical functions will execute in a reliable way with a predictable quantifiable delay. This is very important in handling real-time operating system actions such as dealing with high priority interrupts. In those cases, timing literally depends on counting instruction-by-instruction.

(b) High performance—since there is no off-chip memory overhead for cache line flushing and replacement, the present invention provides improvements in overall system performance. Although, a MACRO CALL instruction itself does constitute additional overhead (since it is not needed in the prior art), this overhead cost is amortized with faster code execution once the "on-chip" MACRO ROM begins to execute; resulting in overall better throughput compared to an arrangement having no "on-chip" memory. While it is recognized that the same code thread (assuming it is fully cached) may execute faster from a scratch pad or cache memory (since there is no MACRO CALL instruction), the lack of cache hardware overhead and other advantages allow the present invention to improve throughput. It should also be noted that with regard to performance, there are no cache miss penalties, which can affect cache based systems.

(c) On-chip storage size—overall, the use of an "on-chip" ROM device to store a MACRO, provides better performance than use of a comparable sized RAM device. In this regard, a ROM device is denser than a RAM device, hence a 1K byte RAM is typically (depending on technologies) the same size in silicon area as a 4K byte ROM. Consequently, the on-chip MACRO ROM of the present invention can store significantly more data, as compared to an on-chip RAM of comparable size. Furthermore, it should be appreciated that the "on-chip" MACRO ROM constitutes expanded code, hence MACROs appear multiple times in the user source code where they get expanded. Consequently, a 4K byte ROM could in fact hold, for example, 32K bytes or more of user code streams (due to replicated instantiation of the MACROs in the source code). With caches and scratch pads, each memory location addresses one and only one instruction location. As a result, they do not have the code savings advantages associated with the expansion provided by the MACROs of the present invention.

(d) Reduction in application code size—since the "on-chip" MACRO ROM of the present invention stores MACROs called in the user source code, the MACRO CALL instruction can be used to replace the application source associated with the stored MACRO. For example, a MACRO might be implemented as follows:

| MOV R1,R2 | = MACRO CALL x12,4 |
| ADDI R2,1,R2 | |
| MWR R2+,R1 | |
| MWR R2+,R3 | |

Assuming this MACRO appears 16 times in the application code, there will be a total of 64 instructions which can be replaced with 16 "MACRO CALL" instructions, yielding a net savings of 48 instructions. Hence, the end result code image shrinks, since a single MACRO CALL instruction replaces the indicated four instruction sequence, wherever it appears in the application code base. The example shown in FIG. 2 provides a code savings of 50% compared to the original program.

(e) Good for context switching—the present invention does not suffer from locality of reference issues and cache update thrashing which may be associated with context switching applications.

(f) Low power for fetching—the reading of ROM devices consume less power than reading RAM devices. Therefore, fetching from the "on-chip" MACRO ROM will result in less power consumption, as compared to fetching from an "on-chip" RAM. Obviously it is also lower power than fetching the equivalent instructions from an off-chip RAM/ROM device as well.

Other applications of the current invention may include passing parameters such as constants used by the instructions in the macro. Also the MACROS may include of compressed code that is uncompressed while fetching from the MACRO ROM 100. MACRO ROM 100 could also cooperate with other elements in the memory hierarchy before reaching external memory. One example might be systems where external off-chip memory 10 is replaced with an on-chip cache memory.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

What is claimed is:

1. A method for processing instructions in a data processing system including a first memory, a first program counter, an instruction decoder, and an execution unit, the method comprising the steps of:

retrieving instructions from the first memory using the first program counter;

decoding the instructions retrieved from the first memory using the instruction decoder;

generating a macro execution signal in response to decoding of each MACRO CALL instruction received thereby;

executing of one or more subsequent instructions stored in a second memory using the execution unit and a second program counter, in response to generation of the macro execution signal, wherein said MACRO CALL instruction identifies a macro address space defined by a macro starting address in the second memory and an offset value indicative a macro ending address;

executing a selected set of instructions stored in the second memory using the execution unit and the second program counter, in response to a second MACRO CALL instruction disposed in the macro address space; and completing execution of instructions stored in the second memory upon detection of the end of the macro.

2. A method for processing instructions according to claim 1, wherein said instruction decoder, said first program counter, said second program counter, said execution unit, and said second memory are located on a common semiconductor device.

3. A method for processing instructions according to claim 2, wherein said first memory is located off-chip from said instruction decoder, said first program counter, said second program counter, said execution unit, and said second memory.

4. A method for processing instructions according to claim 1, wherein said execution unit begins executing instructions retrieved from said first memory, in response to the second program counter reaching said ending address, wherein said first program counter is used to retrieve instruction from said first memory.

5. A method for processing instructions according to claim 1, wherein said first program counter is stalled while instructions are being retrieved from the second memory, and resumes operation in response to the second program counter reaching said ending address.

6. A method for processing instructions according to claim 1, wherein said instructions stored in said second memory may include instructions which cause looping to instructions stored therein.

7. A data processing system comprising:

a first memory for storing instructions;

a first program counter for addressing the first memory;

an instruction decoder for decoding instructions, wherein said instruction decoder generates a macro execution signal in response to decoding of each MACRO CALL instruction received thereby;

an execution unit for executing instructions;

a second memory for storing instructions;

a second program counter for addressing the second memory;

a control unit for controlling the retrieval of instructions from the second memory, wherein said execution unit executes one or more instructions, including at least a second MACRO CALL instruction, which one or more instructions are stored in the second memory, in response to generation of the macro execution signal, wherein said first MACRO CALL instruction identifies a macro starting address in the second memory and an offset value indicative a macro ending address;

means for communicating the second MACRO CALL instruction to the instruction decoder; and wherein execution of instructions stored in the second memory is completed in accordance with the address in the second program counter.

8. A data processing system according to claim 7, wherein said instruction decoder, said first program counter, said second program counter, said execution unit, said control unit, and said second memory are located on a common semiconductor device.

9. A data processing system according to claim 8, wherein said first memory is located off-chip from said instruction decoder, said first program counter, said second program counter, said execution unit, said control unit, and said second memory.

10. A data processing system according to claim 7, wherein said execution unit begins executing instructions retrieved from said first memory, in response to the second program counter reaching said ending address, wherein said first program counter is used to retrieve instruction from said first memory.

11. A data processing system according to claim 7, wherein said first program counter is stalled while instructions are being retrieved from the second memory, and resumes operation in response to the second program counter reaching said ending address.

12. A data processing system according to claim 7, wherein said instructions stored in said second memory may include instructions which cause looping to instructions stored therein.

13. A data processing system comprising:

first means for storing instructions;

first means for addressing the first means for storing instructions;

means for decoding instructions, wherein said means for decoding instructions generates a macro execution signal in response to decoding of each MACRO CALL instruction received thereby;

means for executing instructions;

second means for storing instructions;

second means for addressing the second means for storing; and control means for controlling fetching of instructions stored in the second means for storing, wherein said means for executing instructions executes of one or more instructions stored in the second means for storing, in response to generation of the macro execution signal, wherein said MACRO CALL instruction identifies a macro address space defined by a macro starting address in the second means for storing and an offset value indicative a macro ending address, wherein a second MACRO CALL instruction is disposed in the macro address space, and wherein execution of instructions stored in the second means for storing is completed upon detection of the end of the macro ending address.

14. A data processing system according to claim 13, wherein said means for decoding instructions, said first means for addressing, said second means for addressing, said means for executing instructions, said control means, and said second means for storing are located on a common semiconductor device.

15. A data processing system according to claim 14, wherein said first means for storing is located off-chip from said means for decoding, said first means for addressing, said second means for addressing, said means for executing instructions, said means for control, and said second means for storing.

16. A data processing system according to claim 13, wherein said first means for executing instructions begins executing instructions retrieved from said first means for storing, in response to the second means for addressing reaching said ending address, wherein said first means for addressing is used to retrieve instructions from said first means for storing.

17. A data processing system according to claim 13, wherein said first means for addressing is stalled while instructions are being retrieved from the second means for storing, and resumes operation in response to the second means for addressing reaching said ending address.

18. A data processing system according to claim 13, wherein said instructions stored in said second means for storing may include instructions which cause looping to instructions stored therein.

19. A method of operating a data processing system to execute one or more instructions stored in an on-chip memory device located on-chip with data processing components and an off-chip memory device located remote therefrom, comprising:
    fetching a MACRO CALL instruction from the off-chip memory device;
    decoding the MACRO CALL instruction to identify a macro stored in the on-chip memory device;
    executing the MACRO CALL instruction, wherein execution of the MACRO CALL instruction results in the generation of a macro execution signal, wherein said macro execution signal causes retrieval and execution of one or more instructions from the on-chip memory, which one or more instructions include a nested MACRO CALL instruction, and ending upon detection of the end of the macro.

20. A method according to claim 19, wherein the end of the macro is detected by identifying an ending address.

21. A method according to claim 19, wherein the end of the macro is detected by identifying a MACRO END instruction stored in the on-chip memory device.

22. A method according to claim 19, wherein said MACRO CALL instruction identifies the number of instructions to execute from the on-chip memory device, the end of the macro detected by detecting the number of instructions.

23. A method according to claim 1, wherein said instructions stored in said second memory includes other MACRO CALL instructions.

24. A data processing system according to claim 7, wherein said instructions stored in said second memory includes other MACRO CALL instructions.

25. A data processing system according to claim 13, wherein said instructions stored in said second means for storing instructions includes other MACRO CALL instructions.

* * * * *